United States Patent [19]

Roberts et al.

[11] 4,385,087
[45] May 24, 1983

[54] FACETTED TINSEL AND METHOD AND APPARATUS FOR MANUFACTURING SAME

[76] Inventors: Harold S. Roberts, 950 Tranquil La., Memphis, Tenn. 38116; Zigfried Weber, 2227 Woodruff Dr., Germantown, Tenn. 38138

[21] Appl. No.: 27,810

[22] Filed: Apr. 6, 1979

[51] Int. Cl.³ .................... A47G 33/08; B32B 3/02; B32B 15/08
[52] U.S. Cl. .......................... 428/7; 264/146; 264/160; 425/303; 425/307; 428/54; 428/114
[58] Field of Search .................... 428/7, 54, 114

[56] References Cited

U.S. PATENT DOCUMENTS 2,362,092 11/1944 Phelps .................................. 428/7
2,893,149 7/1959 Reece et al. ........................ 428/7

FOREIGN PATENT DOCUMENTS 266907 5/1950 Switzerland ........................ 428/7
294605 10/1971 U.S.S.R. ............................. 428/7

Primary Examiner—James C. Cannon

[57] ABSTRACT

A tinsel facetting apparatus and method for use in facetting a metallized polyvinyl chloride (PVC) strip including a pair of serrated rolls having a thermal element located in each roll. The PVC strip is facetted as it travels between the two rolls which are maintained at a predetermined temperature determined by the color of the PVC strip. The apparatus and method further provide for timed slitting of the PVC strip into spaced sections constituting facetted icicles, each spaced section separated from the next by a header portion and timed cutting the PVC strip into segments including a spaced section and an unslit header portion so the facetted icicles hang freely from the header portion.

2 Claims, 9 Drawing Figures

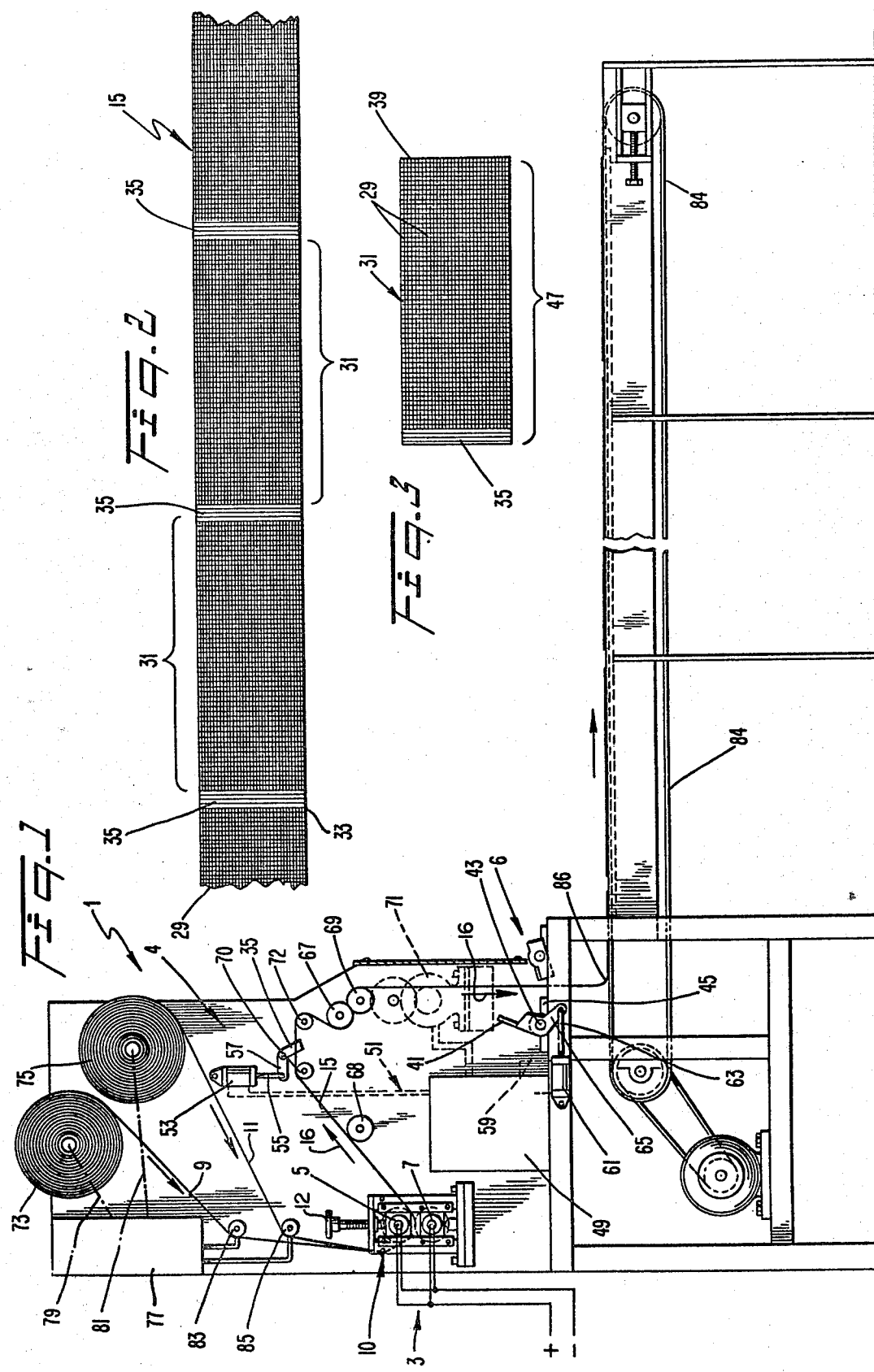

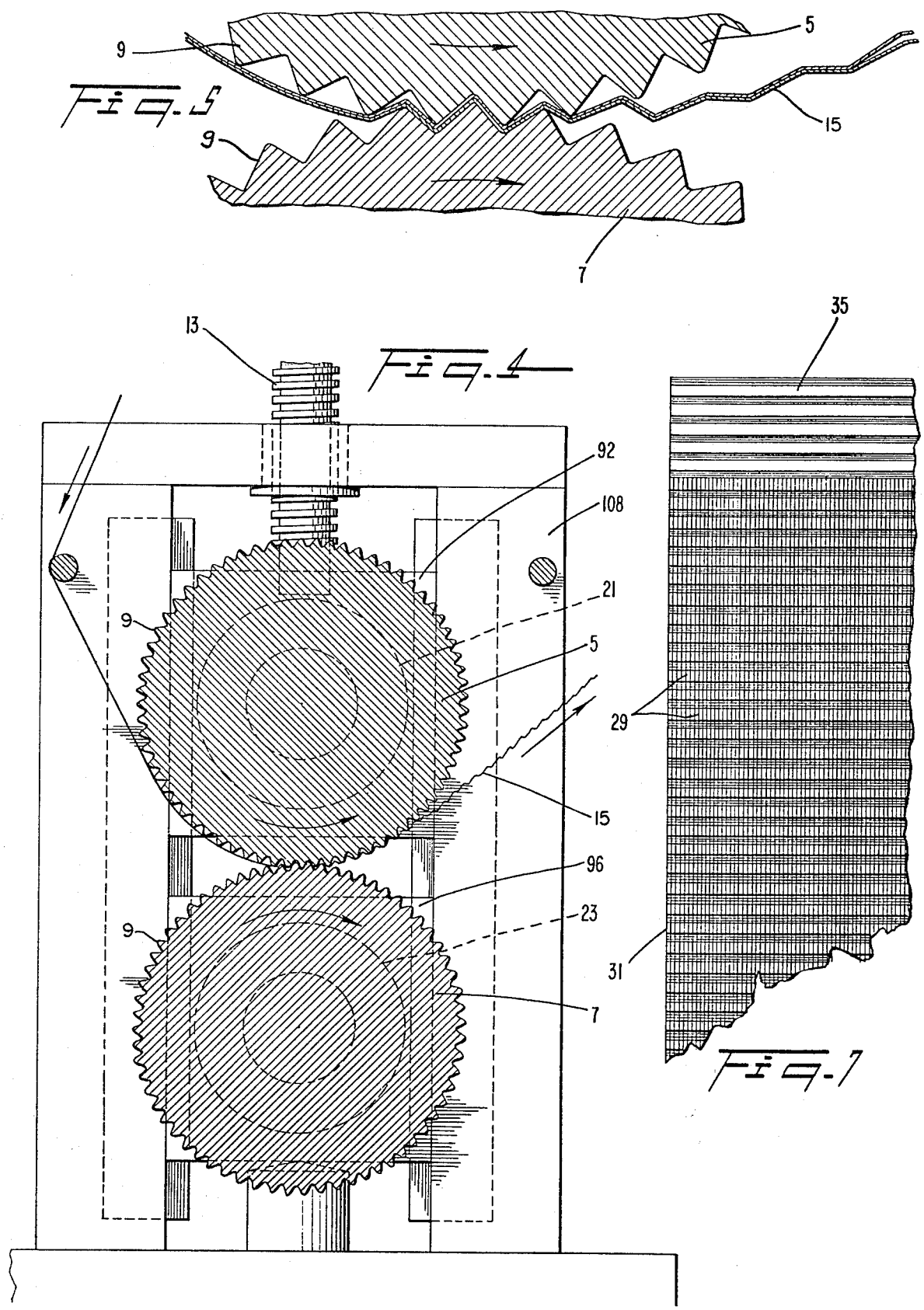

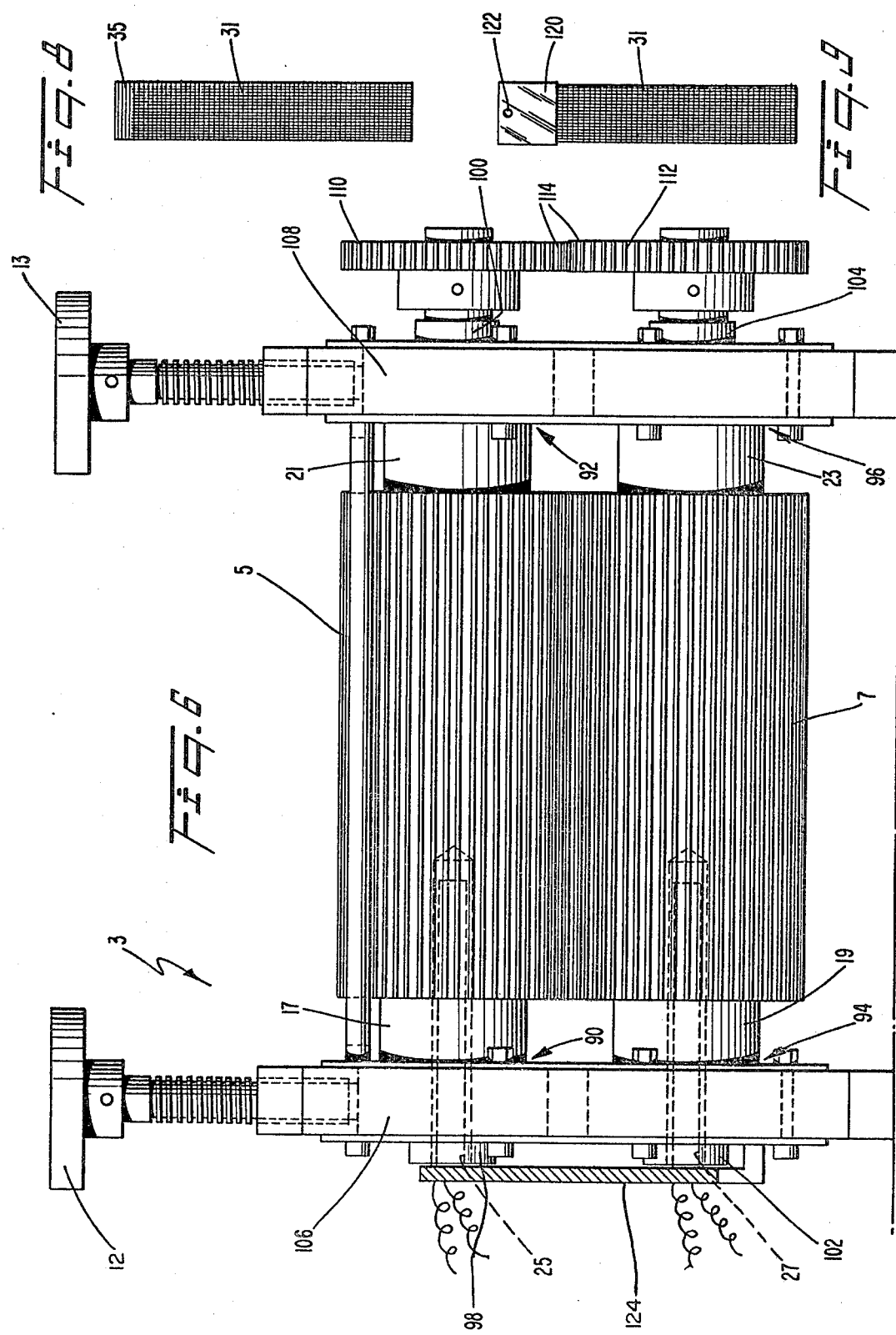

FACETTED TINSEL AND METHOD AND APPARATUS FOR MANUFACTURING SAME

BACKGROUND OF THE INVENTION

The present invention relates to an apparatus and method for facetting a metallized polyvinyl chloride (PVC) strip and processing the facetted strip into facetted tinsel icicles packaged for retail display.

The prior art includes tinsel which is unfacetted and prepared from metallized PVC strips. The inventors desired, however, to produce facetted PVC tinsel icicles which would be more attractive than conventional tinsel icicles and to develop a method and apparatus for efficiently manufacturing such facetted tinsel icicles and for readily and inexpensively displaying them for sale.

Prior attempts to develop a facetting technique for manufacturing PVC tinsel strips have proven unsatisfactory. Such attempts have involved pre-facetting the PVC strip, rolling it on a reel and then feeding this material through a conventional cutting and slitting machine to make tinsel. This technique was found to be unsatisfactory because the tension applied in re-rolling the facetted strip onto a supply reel smoothed out the crimping or facetting folds and substantially eliminated the facetted appearance of the strip. Rolling the pre-facetted strip more loosely on the supply reel did not solve the problem since the loosely wound supply reel would not feed the slitter device properly.

OBJECTS AND SUMMARY OF THE INVENTION

It is accordingly an object of the invention to provide a method and means of facetting a metallized PVC strip for producing more attractive tinsel icicles.

Another object of the invention is to provide a method and means for slitting and cutting a facetted PVC strip into segments of tinsel icicles for convenient display in stores.

Still another object of the disclosed invention is to provide improved PVC decorative icicle products having facetted strands.

The objects and advantages of this invention may be realized and obtained by means disclosed herein and particularly pointed out in the appended claims.

To achieve the foregoing objects and in accordance with the purpose of the invention, as embodied and broadly described herein, there is provided a tinsel facetting apparatus, and the method implemented thereby, including means for deforming a continuous metallized PVC strip to create a plurality of facets on the strip; means for slitting spaced sections of the facetted strip into strands constituting facetted icicles of a predetermined length whereby the ends of the slit strands are connected to an unslit header portion of the strip; and means for cutting the continuous strip into segments having a length equal to the predetermined length plus the length of the header portion so that the facetted icicles are attached at one end to the header portion and are unattached and hang freely at the other end.

Preferably, the deforming means comprises a pair of rolls each having teeth extending across the width of the roll and evenly spaced around the circumference thereof, each of the teeth being rounded at its outer end and the pair of rolls being rotatably disposed one adjacent the other in non-contacting meshing engagement. Further, one of the rolls is provided with adjustment means for adjusting the space between the rolls so as to provide at least a 0.001 inch clearance therebetween to enable the strip to be fed between and to rotate the rolls. A thermal element is disposed within each roll along its rotational axis to maintain the rolls at a predetermined temperature for setting a permanent crimp or facet into the PVC strip.

It is also preferable that the means for slitting the spaced sections of the strip include a plurality of slitter blades movably retained adjacent to the flow line so that the slitter blades can be alternately moved in and out of contact with the strip; and wherein control means connected to the slitter blades activates the blades in accordance with a predetermined timing sequence in order that the spaced sections and the header portions are cut to a predetermined length.

Preferably, the means for cutting the continuous strip into segments includes a cutter bar pivotably retained adjacent to the flow line downstream from the slitter means and further includes actuating means for pivoting the cutter bar in accordance with a predetermined timing sequence to cut the facetted strip along its width into segments of predetermined length.

The invention also includes, as broadly described herein, a tinsel product comprising a metallized PVC strip. Furthermore, the strip is divided lengthwise into two separate portions, a first portion being divided into a plurality of narrow strands of predetermined length and the second portion being a shorter length of unslit strip to which the strands are attached.

The present invention overcomes the previously described problems experienced in producing a facetted metallized PVC strip by facetting, slitting, and cutting the facetted PVC strip in one operation whereby the re-rolling step is avoided.

BRIEF DESCRIPTION OF THE DRAWINGS

The accompanying drawings, which are incorporated in and constitute a part of the specification, illustrate embodiments of the invention and, together with a description, serve to explain the principles of the invention.

FIG. 1 is a side elevation view of the tinsel facetting apparatus of the invention.

FIG. 2 illustrates a metallized PVC strip which has been longitudinally slit in accordance with the principles of the invention.

FIG. 3 shows a cut segment from the strip of FIG. 2.

FIG. 4 is a side elevation view, partially sectioned, of the facetting roll shown in FIG. 1.

FIG. 5 is a sectional view of the facetting rolls showing the metallized PVC strip as it is fed between the teeth of the rolls.

FIG. 6 is a front view of the facetting roll assembly.

FIG. 7 is an enlarged view of a portion of the section of strip illustrated in FIG. 3 showing the facetting of the PVC strip.

FIG. 8 shows a cut segment of the strip folded in half.

FIG. 9 shows the cut and folded segment of FIG. 8 with the header section fastened to a holder for display purposes.

DETAILED DESCRIPTION OF PREFERRED EMBODIMENT

Reference will now be made in detail to a preferred embodiment of the invention, which is illustrated in the accompanying drawings. A preferred embodiment of the tinsel facetting apparatus is shown as numeral 1 in FIG. 1 and is generally described as follows.

Continuous sheets of PVC film 9 and 11 are supplied from two separate supply reels 73 and 75 to form a single two-layer strip 15. Drive rolls 67 and 69 exert frictional force upon PVC strip 15 to pull the film 9 and 11 from supply reels 73 and 75 for processing. As PVC film 9 and 11 is pulled from supply reels 73 and 75, each film engages a dancer arm and rollers 83 and 85, respectively, of a tension control unit 77. Unit 77 applies a variable braking force to supply reels 73 and 75 through braking means indicated by dashed lines 79 and 81, respectively, to maintain a constant tension on the films 9 and 11. PVC film 9 and 11 merge into single PVC strip 15 at guide bar 10 and enters a facetting roll assembly 3 including facetting rolls 5 and 7 which are provided with a plurality of teeth and thermal elements for applying facetting folds or crimps to the PVC strip 15. Facetted PVC strip 15 then enters the slitting apparatus 4 including slitter blades 35. The slit PVC strip 15 exiting the feed rolls 67, 69 is gravity-fed to cutter apparatus 6 to be cut by cutter bar 41 into display portions. The plurality of display portions are carried away from the cutter apparatus on conveyor belt 84 for further processing which includes folding the display portions in half to create a four-layer tinsel section and attaching, for example, a cardboard holder to a header section of the strip.

In accordance with the invention, the tinsel facetting apparatus includes means for deforming a continuous metallized PVC strip to create a plurality of facets on the strip. As embodied herein and shown in FIGS. 1, 4, 5 and 6, the deforming means 3 includes a pair of rolls 5 and 7 each having teeth 9 which extend across the width of the roll and which are evenly spaced about the circumference of the roll. Each of the teeth 9 is generally triangular in shape and is rounded at its outer end as shown in FIG. 5. The pair of rolls 5 and 7 are rotatably disposed one above the other with top roll 5 adjustably mounted by means of threaded actuators 12 and 13 such that teeth 9 of roll 5 mesh with teeth 9 of roll 7. Actuators 12 and 13 are rotatable to enable vertical adjustment of the position of roll 5 with respect to roll 7. Rolls 5 and 7 are preferably adjusted so as to provide approximately a 0.001 inch clearance between the opposed surfaces of teeth 9 to enable strip 15 to be fed between the teeth to cause rolls 5 and 7 to rotate. Preferably, teeth 9 may be adjusted to mesh such that the overlap of adjacent teeth is a substantial percentage of the length of the tooth from tip to base as shown in FIG. 5. As further shown, in accordance with the preferred embodiment, the sides of each triangular tooth are disposed at approximately a 45° angle with respect to each other.

The support structure for rolls 5 and 7 includes a journal bearing provided at each end of the rolls, which bearings are mounted in a pair of sideframes. Referring to FIG. 6, journals 17 and 21 are provided on roll 5 and journals 19 and 23 are provided on roll 7. Stub ends 98 and 100 on journals 17 and 21, respectively, and stub ends 102 and 104 on journals 19 and 23, respectively, rotate in journal bearings 90, 92, 94, and 96 provided in sideframes 106 and 108. Spur gears 110 and 112 mounted on shafts extending from stub ends 100 and 104, respectively, operate to maintain rolls 5 and 7 in a fixed rotational relationship whereby the teeth 9 are maintained out of contact with one another as the rolls rotate. To assure this non-contacting relationship, the teeth on gears 110 and 112 should be relatively accurately machined to provide a minimum amount of backlash. The rolls 5 and 7 are not coupled to any drive means other than the PVC strip itself, and it is the feed motion of the latter which operates to rotate the rolls.

To assure proper facetting of PVC strip 15, in accordance with the invention, rolls 5 and 7 are further provided with thermal elements 25 and 27 disposed internally within the rolls 5 and 7 along the rotational axis thereof as shown in FIG. 6. Appropriate electrical circuit means (not shown) operate to energize elements 25 and 27 whereby rolls 5 and 7 are maintained at a predetermined temperature for facetting strip 15. As embodied herein, the thermal elements are inserted in cavities provided along the axes of journals 17 and 19 and are fixedly supported by the member 124. Elements 25 and 27 remain stationary as the rolls rotate about them. Appropriate clearance is provided between the thermal elements and the internal surfaces of the journal cavities so that frictional contact is prevented.

It has been found that the proper roll temperature for inducing a substantially permanent set in the PVC strip depends on the type of metallized PVC film employed. For example, when two layers of 35 micron PVC film metallized with a gold colored finish are passed through the rolls, the desired predetermined roll temperature has been found to be approximately 102° F. When silver-metallized 35 micron PVC film is used, the desired predetermined temperature is approximately 118° F. Further, when a layer of gold-metallized PVC film is used with a layer of blue-metallized film, the desired roll temperature is approximately 121° F. Different temperatures may be required for different thicknesses and finish colors of metallized PVC strip. Such strip is available commercially from various suppliers. One such supplier is Standard Packaging Corp., National Metallizing Div., Cranbury, N.J.

In accordance with the invention, the tinsel facetting apparatus further includes means for slitting spaced sections of the facetted strip into individual strands constituting facetted icicles of a predetermined length, whereby the ends of the slit strands are connected to an unslit header portion of the strip. Referring to FIG. 2, strip 15 is slit at spaced intervals 31 whereupon the strip is divided into a plurality of slit or spaced sections 31 of predetermined length joined together by unslit header portions 35, also of predetermined length.

As embodied herein and illustrated in FIG. 1, slitting means including a plurality of slitter blades 35 (only one of which is shown) are positioned adjacent to flow line 16 and arranged so that the slitter blades 35 can be moved in and out of contact with strip 15. As shown, the slitter means further includes pivot arm 57 coupled to the blades 35 and further connected to the stem 55 of an actuator 53. A control means 49 including, for example, electronic or pneumatic control components operates to control actuator 53 to pivot the blades so that strip 15 is slit into spaced sections 31 as shown in FIG. 2 discussed above. When a signal is transmitted from unit 49 through line 51 to actuator 53, arm 55 is actuated to pivot blades 35 into contact with PVC strip 15 as it crosses support rolls 70 and 72 to provide the desired slitting operation. Appropriate timing means are employed in control circuit 49 so that the pivot motion of the blades is synchronized with the speed of the strip to achieve the desired predetermined section lengths.

In accordance with the invention, the tinsel facetting apparatus further includes means for cutting the continuous strip 15 into sections as shown in FIG. 3 wherein facetted icicle strands 29 are attached at one end to header portion 35 and are unattached and hang freely at the other end 39. As embodied herein, the cutter means includes a cutter bar 41 (FIG. 1) pivotably mounted adjacent to flow line 16 downstream from the slitter blades 35. As shown in FIG. 1, cutter bar 41 is pivotably retained by pin 43 on a support 45 and includes a pivot arm 65 which is connected to the control stem 63 of an actuator 61. The latter, which may be, for example, electrical or pneumatic, is coupled to control means 49 via line 59 whereby control signals are applied to operate cutter bar 41. Appropriate timing means are provided in control 49 to supply a series of signals synchronized with the movement of strip 15 so as to cut sections 47 as shown in FIG. 3. As indicated, cutter bar 41 operates to separate the strip at the point where individual tinsel strands 29 join the header section 35 of the adjacent section 47, i.e., the border 33 shown in FIG. 2.

Further, as embodied herein and illustrated in FIG. 1, the tinsel facetting apparatus is provided with a pair of pressure rolls 67 and 69 coupled to a drive motor 71. The rolls 67, 69 are located along flow line 16 between slitter blades 35 and cutter bar 41 and frictionally engage strip 15. The pressure rolls provide the tension which pulls the PVC films 9 and 11 from supply reels 73 and 75 and feeds them through the facetting and slitting apparatus. The apparatus may also include a plurality of appropriate guide rolls, such as roll 68, provided along flow line 16. Strips 9 and 11 pass over a guide bar 10 located at the entrance to the facetting roll assembly. The films 9 and 11 merge at bar 10 to form the single two-layer strip 15. Thus, as shown in FIG. 1, strip 15 is pulled by rolls 67, 69 off of supply reels 73 and 75 and is drawn through the facetting rolls 5, 7 and past slitter blades 35. Upon being discharged from the rolls 67, 69, the strip is gravity-fed past the cutter bar 41 and drops onto the conveyor 84 at point 86.

Further in accordance with the invention, the tinsel facetting apparatus is provided with tension control means 77 for maintaining constant tension on the strip 15. Tension control 77 utilizes a pair of dancer arms and rollers 83 and 85 which contact PVC films 9 and 11 running from supply reels 73 and 75 to the facetting rolls. Braking means indicated by dashed lines 79 and 81 operate to apply a braking force to reels 73 and 75, respectively, in response to the tension sensed by the dancer arms. This operates to maintain relatively constant tension on the PVC strip. Thus, when reels 73 and 75 are full, the braking force applied by tension control 77 through brake 79 to reel 73 and through brake 81 to reel 75 is less than when the reels have only a small amount of film remaining. Uniform strip tension is required in order to achieve an even facetting operation at rolls 5 and 7 and a constant feed velocity past slitter blades 35 and cutter bar 41.

Thus, in summary, the apparatus herein described operates to automatically feed a pair of metallized PVC films in a single two-layer strip 15 through the facetting rolls 5 and 7, where both layers of the strip are crimped or facetted as shown in FIG. 5. Thereafter, the strip is intermittently slit as illustrated in FIG. 2 and cut into individual sections as shown in FIG. 3. The sections drop onto the conveyor belt 84 (FIG. 1) and are manually gathered and packaged by operators stationed along the conveyor. Each two-layer section may be folded lengthwise as shown in FIG. 8 to form a four-layer tinsel section having freely hanging strands which are joined to a header section. The latter may be stapled or otherwise fastened to cardboard folder 120 as shown in FIG. 9 to form a final display package which may be hung from a display rack by appropriate means such as aperture 122. In this manner, the highly attractive facetted tinsel product is given maximum exposure for generating high consumer interest. The enlarged view of cut strip 15 in FIG. 7 shows the facets as alternating shaded and unshaded areas which reflect light so as to give the tinsel product a highly attractive appearance.

It will be apparent to those skilled in the art that further modifications or variations can be made of the disclosed tinsel facetting apparatus. Thus, it is intended that the present invention cover the modifications and variations of this invention provided they come within the scope of the appended claims and their equivalents.

We claim:
1. Tinsel comprising:
a metallized PVC strip wherein said strip is divided lengthwise into first and second portions, said first portion being divided into a plurality of narrow strands of a predetermined length and said second portion being of shorter length and including a section of unslit strip to which said strands are attached.
2. Tinsel as described in claim 1 in which said strip is facetted along its entire length.

* * * * *